(12) United States Patent
Kim

(10) Patent No.: US 11,350,210 B2
(45) Date of Patent: May 31, 2022

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventor: Youngbeom Kim, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/082,946

(22) Filed: Oct. 28, 2020

(65) Prior Publication Data

US 2022/0060815 A1 Feb. 24, 2022

(30) Foreign Application Priority Data

Aug. 18, 2020 (KR) .................. 10-2020-0103491

(51) Int. Cl.
| | |
|---|---|
| *H04R 1/34* | (2006.01) |
| *H04R 29/00* | (2006.01) |
| *H04R 3/00* | (2006.01) |
| *G10L 25/48* | (2013.01) |
| *H04R 1/02* | (2006.01) |
| *G06V 40/10* | (2022.01) |

(52) U.S. Cl.
CPC .............. *H04R 1/345* (2013.01); *G06V 40/10* (2022.01); *G10L 25/48* (2013.01); *H04R 1/025* (2013.01); *H04R 3/00* (2013.01); *H04R 29/001* (2013.01); *H04R 2420/07* (2013.01); *H04R 2499/13* (2013.01)

(58) Field of Classification Search
CPC .......... H04R 1/345; H04R 1/025; H04R 3/00; H04R 29/001; H04R 2420/07; H04R 2499/13; H04R 1/02; H04R 5/02
USPC .............. 381/86–87, 336, 386, 148, 333–334
See application file for complete search history.

(56) References Cited

U.S. PATENT DOCUMENTS

| | | | |
|---|---|---|---|
| 10,192,566 B1* | 1/2019 | Bullough | H04R 3/005 |
| 2007/0203646 A1* | 8/2007 | Diaz | G01C 21/36 |
| | | | 701/469 |
| 2012/0083314 A1* | 4/2012 | Ng | H04N 7/142 |
| | | | 455/557 |
| 2018/0054561 A1* | 2/2018 | Morita | H04N 5/23219 |
| 2019/0009786 A1* | 1/2019 | Liu | B60C 23/0479 |
| 2019/0045319 A1* | 2/2019 | Hotary | G06K 9/00832 |
| 2020/0202631 A1* | 6/2020 | Tomida | H04N 13/305 |
| 2020/0213705 A1* | 7/2020 | Ding | H02J 7/0045 |
| 2020/0298413 A1* | 9/2020 | Qian | B25J 9/1697 |
| 2021/0044739 A1* | 2/2021 | Kim | G06V 40/161 |

* cited by examiner

*Primary Examiner* — Disler Paul
(74) *Attorney, Agent, or Firm* — Slater Matsil, LLP

(57) ABSTRACT

A vehicle capable of directing a sound output from a center speaker to a passenger by adjusting a tilt angle and a swivel angle of a cradle for a user terminal device includes: a center speaker provided on a dashboard; a cradle provided within a preset distance from the center speaker, fixing a user terminal device, and configured to tilt and swivel; a camera configured to obtain an image of a passenger; and a controller configured to determine an ear position of the passenger based on the image of the passenger, determine a first angle and a second angle based on the ear position of the passenger, and control the cradle to be tilted by the first angle and swiveled by the second angle.

19 Claims, 5 Drawing Sheets

VEHICLE AND CONTROL METHOD THEREOF

CROSS-REFERENCE TO RELATED APPLICATION

This application claims priority to and the benefit of Korean Patent Application No. 10-2020-0103491, filed on Aug. 18, 2020, the disclosure of which is incorporated herein by reference in its entirety.

TECHNICAL FIELD

The present disclosure relates to a vehicle and control method thereof, and more particularly, to a vehicle in which a cradle for a user terminal device provided inside the vehicle is automatically tilted and swiveled according to the position of a passenger's ear, and a control method thereof.

BACKGROUND

A vehicle means a device capable of transporting people or objects to a destination while driving on a road or track. The vehicle can be moved to various positions mainly by using one or more wheels installed on the vehicle body. Such a vehicle may include a three-wheeled or four-wheeled vehicle, a two-wheeled vehicle such as a motorcycle, a construction machine, a bicycle, and a train running on a rail disposed on a track.

In addition, the vehicle performs a navigation function, a telephone function, an audio function, a radio function, a broadcast function, a text message service function, an internet function, etc., and recently, various softwares for performing more various and complicated functions are built-in together.

In addition, the vehicle includes a plurality of speakers to provide various functions to passengers, and among them, the center speaker provided on the dashboard of the vehicle outputs a mid/high range sound.

In general, since the center speaker is located in the center of the dashboard, it is difficult to direct the sound output from the speaker toward the passenger.

SUMMARY

Therefore, the present disclosure provides a vehicle capable of directing a sound output from a center speaker to a passenger by adjusting a tilt angle and a swivel angle of a cradle for a user terminal device provided near a center speaker, and a control method thereof.

In accordance with one aspect of the disclosure, a vehicle includes: a center speaker provided on the dashboard; a cradle provided within a preset distance from the center speaker, fixing a user terminal device, and configured to tilt and swivel; a camera configured to obtain an image of a passenger; and a controller configured to determine the position of the passenger's ears based on the passenger's image, determine the first angle and second angle based on the position of the passenger's ear, and control the cradle to be tilted by the first angle and swiveled by the second angle.

The user terminal device may include a flexible device, the cradle may include an angle adjustment device configured to adjust the folding angle of the flexible device, and the controller may be configured to determine a third angle based on the position of the passenger's ear and control the angle adjustment device so that the flexible device is folded by the third angle.

The controller may be configured to determine the coordinates of the passenger's ear based on the center point of the center speaker, and determine the first angle, the second angle, and the third angle based on the coordinates of the passenger's ear.

The vehicle may further include: a transceiver configured to perform wireless or wired communication with the user terminal device, and the controller may be configured to adjust the sound pressure of the sound output by the center speaker based on sound pressure information received from the microphone of the user terminal device through the transceiver.

The controller may be configured to adjust the sound pressure of the sound output by the center speaker in proportion to the sound pressure size comprised in the sound pressure information received from the microphone of the user terminal device.

The microphone of the user terminal device may be proveded in plural, and the controller may be configured to adjust the sound pressure of the sound output by the center speaker in proportion to the average value of the sound pressure size comprised in the sound pressure information received from the plurality of microphones.

The vehicle may further include: a transceiver configured to perform wireless or wired communication with the user terminal device, and the controller may be configured to control the transceiver to transmit a signal for changing the user terminal device to silent mode when the user terminal device is fixed to the cradle.

In accordance with another aspect of the disclosure, a control method of a vehicle including a cradle provided within a preset distance from a center speaker, fixing a user terminal device, and configured to tilt and swivel includes: obtaining an image of a passenger; determining the position of the passenger's ears based on the passenger's image; determining the first angle and second angle based on the position of the passenger's ear; and controlling the cradle to be tilted by the first angle and swiveled by the second angle.

The user terminal device may include a flexible device, the cradle may include an angle adjustment device configured to adjust the folding angle of the flexible device, and the method may further include: determining a third angle based on the position of the passenger's ear; and controlling the angle adjustment device so that the flexible device is folded by the third angle.

The determining the first angle, second angle and the third angle based on the position of the passenger's ear may include: determining the coordinates of the passenger's ear based on the center point of the center speaker; and determining the first angle, the second angle, and the third angle based on the coordinates of the passenger's ear.

The control method may further include: receiving a sound pressure information from the microphone of the user terminal device; and adjusting the sound pressure of the sound output by the center speaker based on sound pressure information received from the microphone of the user terminal device.

The adjusting the sound pressure of the sound output by the center speaker based on sound pressure information received from the microphone of the user terminal device may include: adjusting the sound pressure of the sound output by the center speaker in proportion to the sound pressure size comprised in the sound pressure information received from the microphone of the user terminal device.

The microphone of the user terminal device may be provided in plural, and the adjusting the sound pressure of the sound output by the center speaker in proportion to the sound pressure size comprised in the sound pressure information received from the microphone of the user terminal device may include: adjusting the sound pressure of the sound output by the center speaker in proportion to the average value of the sound pressure size comprised in the sound pressure information received from the plurality of microphones.

The control method may further include: transmitting a signal for changing the user terminal device to silent mode when the user terminal device is fixed to the cradle.

DRAWINGS

These and/or other aspects of the disclosure will become apparent and more readily appreciated from the following description of the embodiments, taken in conjunction with the accompanying drawings of which:

DETAILED DESCRIPTION

Figure 1:
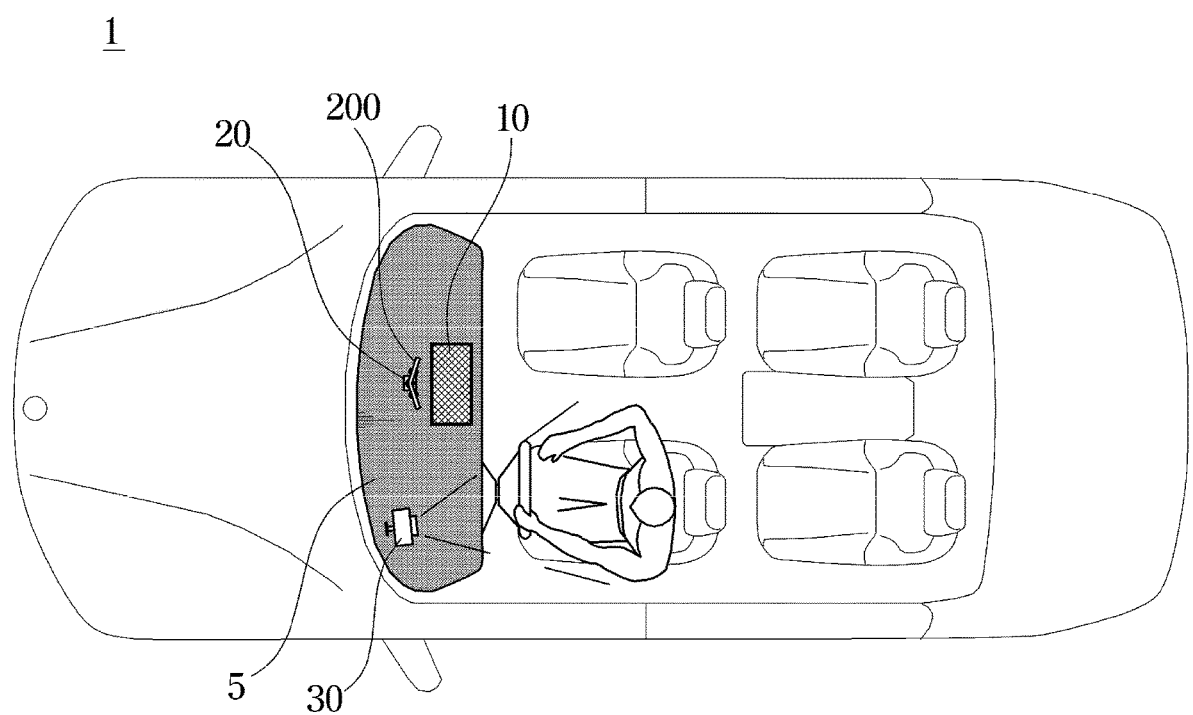
FIG. 1 is a view for illustrating the configuration of a vehicle in one form of the present disclosure.

Like reference numerals refer to like elements throughout the specification. Not all elements of embodiments of the disclosure will be described, and description of what are commonly known in the art or what overlap each other in the embodiments will be omitted.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, like reference numerals refer to like elements throughout the specification. This specification does not describe all elements of the embodiments, and in the technical field to which an exemplary embodiment of the present disclosure pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described with reference to the accompanying drawings.

FIG. 1 is a view for illustrating the configuration of a vehicle in some forms of the present disclosure.

For convenience of description below, as shown in FIG. 1, in general, the direction in which the vehicle 1 moves forward is called forward, and the left and right directions are distinguished based on the front. In addition, the floor direction with respect to the vehicle 1 is called a vertical direction, and a direction parallel to the ground is defined as a horizontal direction.

Referring to FIG. 1, a dashboard 5 may be provided in front of the driver's seat and the passenger seat of the vehicle 1. Various electronic devices such as clusters, AVN devices, and storage boxes may be provided on the dashboard 5.

For example, a center speaker 10 for outputting various sounds may be provided on the upper center of the dashboard 5.

A cradle 20 capable of placing the user terminal device 200 may be provided near the center speaker 10 on the dashboard 5.

The cradle 20 may be provided on the dashboard 5 within a preset distance from the center speaker 10, and for example, may be provided on the top of the center speaker 10.

In addition, the vehicle 1 may be provided with a camera 30 that obtains an image of a passenger. These cameras 30 may be located in front of the driver's seat and passenger seat in order to obtain images of passengers such as the driver seated in the driver's seat of the vehicle 1, the passenger seated in the passenger seat of the vehicle 1, and the passenger seated in the rear seat of the vehicle 1.

For example, the camera 30 may be provided on the top in front of the driver's seat, but it may be provided without limitation if it is a position where a passenger can be photographed.

Figure 2:
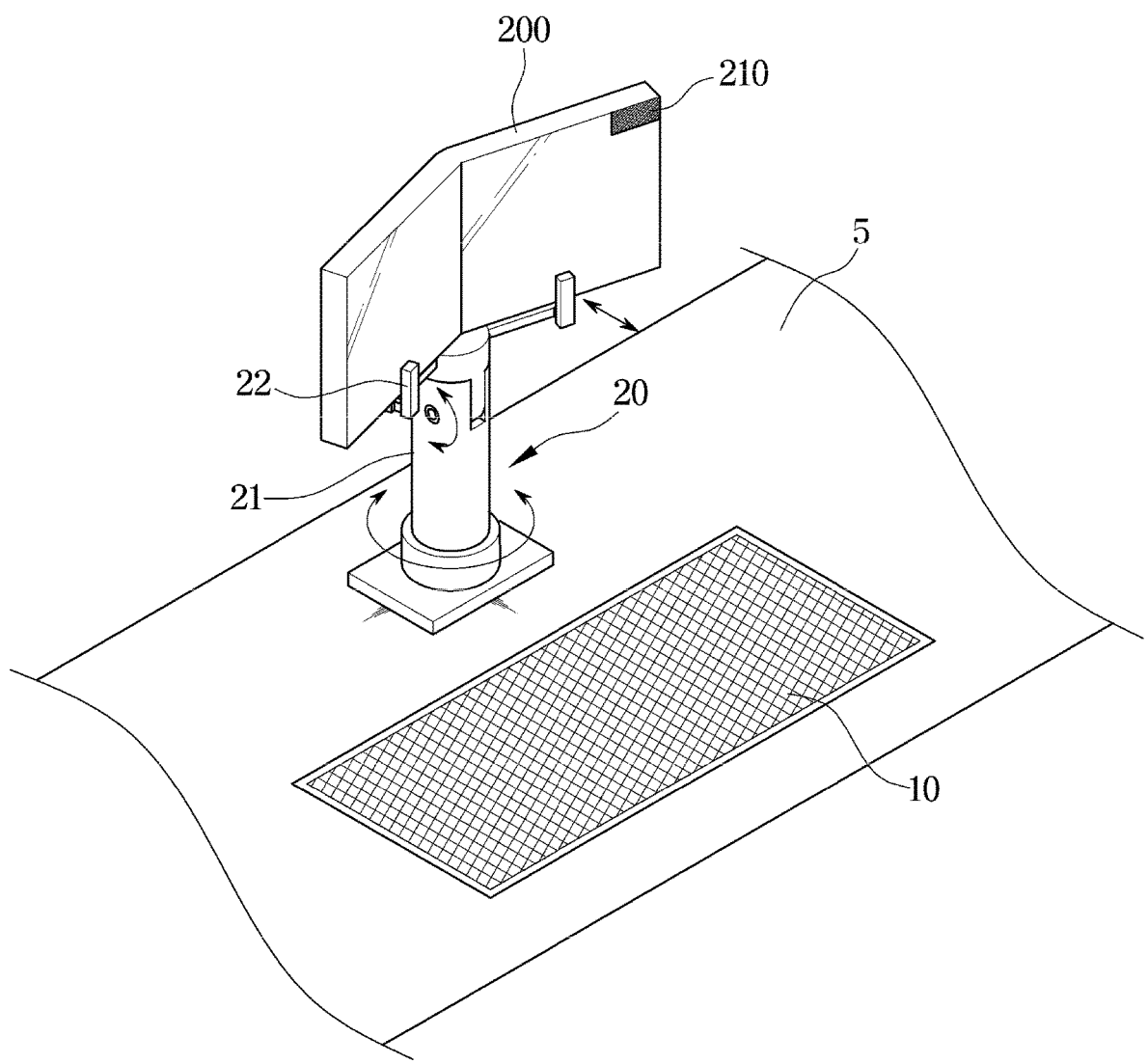
FIG. 2 is an enlarged view of an inner area of a vehicle in one form of the present disclosure.

FIG. 2 is an enlarged view of an inner area of a vehicle in some forms of the present disclosure.

Referring to FIG. 2, the cradle 20 may be provided within a preset distance from the center speaker 10, and the user terminal device 200 fixed to the center speaker 10 may reflect sound output from the center speaker 10.

The cradle 20 may be configured to be tilted or swiveled. Accordingly, the user terminal device 200 fixed to the cradle 20 may also be tilted or swiveled.

When the cradle 20 is tilted, it may mean that the cradle 20 is rotated in the vertical direction. When the cradle 20 is swiveled, it may mean that the cradle 20 is rotated in the left and right directions.

The cradle 20 for this may include a cradle unit 21 configured to be tilted and swiveled.

The user terminal device 200 may include a user's smartphone, laptop, smart watch, etc., but any terminal device capable of performing wireless communication and/or wired communication with the vehicle 1 is employed without limitation.

In this case, the user terminal device 200 may include a flexible device. A flexible device is a device manufactured using a bendable material such as a plastic substrate. And a flexible device refers to a device that is lighter than other devices and has a flexible material without breaking, so that it can be folded, rolled, or bent.

When the part where the flexible device is folded is defined as a folding line, the flexible device can be divided into two areas (hereinafter, "a first area and a second area") based on the folding line.

The user can fold or unfold the flexible device by applying an external force to the first area and the second area of the flexible device.

Hereinafter, the angle formed by the first area and the second area of the flexible device is defined as the folding angle of the flexible device.

The cradle 20 may include an angle adjustment device 22 for adjusting the folding angle of the flexible device.

The angle adjustment device 22 may include a first fixing part for fixing the first area of the flexible device and a second fixing part for fixing the second area of the flexible device.

The first fixing part and the second fixing part included in the angle adjustment device 22 are configured to be independently swiveled, so that the folding angle of the flexible device can be adjusted.

For example, when the second fixing part for fixing the right area is swiveled in the direction of the center speaker 10 while the first fixing part for fixing the left area of the flexible device does not move, the folding angle of the flexible device may be reduced.

The user terminal device 200 according to an embodiment may include at least one microphone 210. The microphone 210 of the user terminal device 200 may receive a sound signal output from the center speaker 10 and perform processing such as amplification and noise removal.

For example, the microphone 210 may detect the sound pressure of sound output from the center speaker 10.

Part of the sound signal output from the center speaker 10 may be reflected by the user terminal device 200, and other parts may be diffracted and spread toward the rear surface of the user terminal device 200, that is, the windshield of the vehicle 1.

The microphone 210 of the user terminal device 200 may preferably be located farther from the center speaker 10 in order to detect the sound pressure of the diffracted sound from the sound output from the center speaker 10.

In addition, the user terminal device 200 may include a plurality of microphones, and when the first microphone 210 is provided in the first region, a second microphone (not shown) may be provided in the second region.

Figure 3:
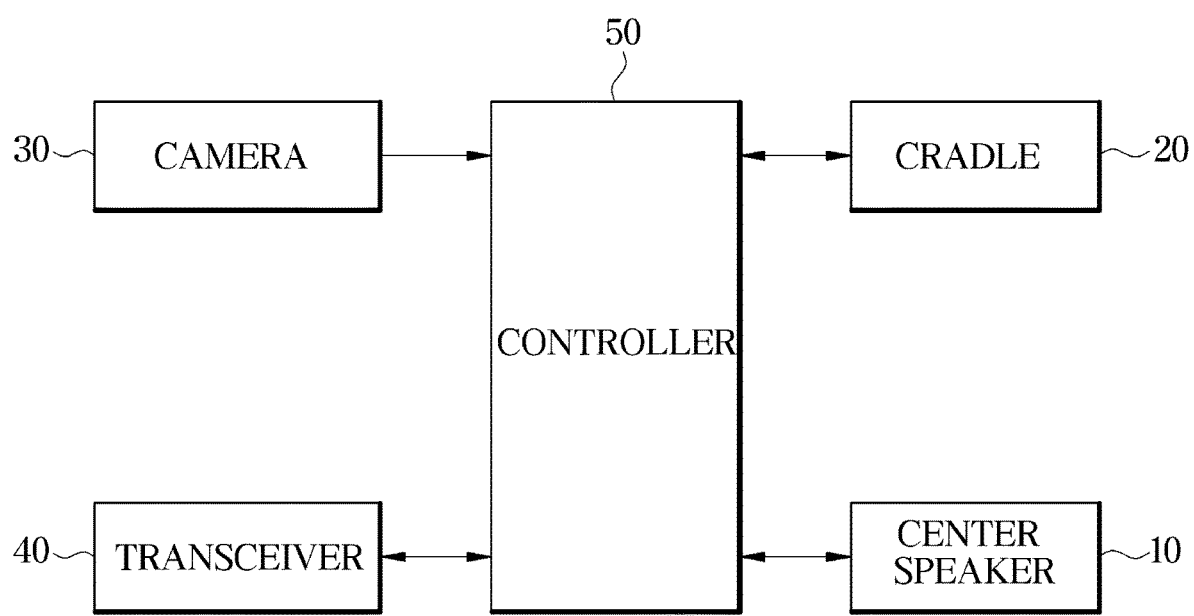
FIG. 3 is a control block diagram of a vehicle in one form of the present disclosure.

FIG. 3 is a control block diagram of a vehicle in some forms of the present disclosure.

Referring to FIG. 3, a vehicle 1 according to an embodiment may include a center speaker 10 provided on the dashboard 5, a cradle 20 provided near the center speaker 10 to fix the user terminal device 200, a camera 30 for obtaining a passenger's image, and a transceiver 40 capable of performing wired/wireless communication with the user terminal device 200 fixed to the cradle 20, and a controller 50 controlling various configurations of the vehicle 1.

The center speaker 10 may output sound under the control of the controller 50.

The center speaker 10 may include an amplifier (not shown) that supplies current for generating sound, and the center speaker 10 may generate sound based on the current supplied from the amplifier.

For example, the center speaker 10 may generate a sound with a larger sound pressure as the magnitude of the current supplied from the amplifier is larger, and may generate a sound with a smaller sound pressure as the magnitude of the current supplied from the amplifier is smaller.

The cradle unit 21 of the cradle 20 may be tilted and/or swiveled under the control of the controller 50, and the angle adjustment device 22 of the cradle 20 can adjust the folding angle of the flexible device.

The cradle 20 for this may include a driving unit (not shown).

The driving unit may tilt or swivel the cradle unit 21 or rotate the angle adjustment device 22 based on a control signal from the controller 50.

Specifically, the driving unit may include a driving motor that generates driving force to tilt and swivel the cradle unit 21 or rotate the angle adjustment device 22, and a driving circuit that supplies driving power to the driving motor according to a control signal from the controller 50.

The driving motor may receive driving power from a driving circuit and convert the supplied driving power into a rotational force. In addition, the cradle unit 21 may be tilted or swiveled by the converted rotational force, and the angle adjustment device 22 may be rotated by the converted rotational force.

For example, the rotational force generated by the driving motor may be transmitted to the cradle 20 through a gear. In other words, the driving motor may tilt or swivel the cradle 20 or rotate the angle adjustment device 22 through a gear.

As another example, the rotational force generated by the driving motor may be transmitted to the cradle 20 through a fluid and a piston.

Such a driving circuit may include a switching element such as a relay for supplying driving power to the driving motor or blocking driving power.

In addition, the cradle 20 may include a wireless power transmitter (not shown) for transmitting wireless power to the fixed user terminal device 200, and a short-range communication module for communicating with the user terminal device 200.

The camera 30 may obtain an image of a passenger, process the obtained image of the passenger, and transmit it to the controller 50.

The camera 30 may mean any configuration capable of acquiring an image of a passenger. For example, the camera 30 may employ a CMOS image sensor or a CCD image sensor.

The transceiver 40 may communicate with the user terminal device 200 to transmit various data and/or information and/or commands to the user terminal device 200, and may receive various data and/or information and/or commands from the user terminal device 200.

For this, the transceiver 40 may be implemented using a communication chip, an antenna, and related components so as to access a wireless communication network. That is, the transceiver 40 may be implemented as various types of communication modules capable of short-range communication or long-distance communication with the user terminal device 200.

For example, the transceiver 40 may include a Bluetooth module capable of performing Bluetooth communication with the user terminal device 200.

In addition, the transceiver 40 may communicate with the cradle 20 by wire to transmit various data and/or information and/or commands to the cradle 20, and may receive various data and/or information and/or commands from the cradle 20.

At this time, the cradle 20 may transmit various data and/or information and/or commands received from the transceiver 40 to the user terminal device 200 fixed to the cradle 20, and may transmit various data and/or information and/or commands received from the user terminal device 200 to the transceiver 40.

That is, the transceiver 40 can communicate with the user terminal device 200 wirelessly or wired.

For this, the controller 50 may include at least one memory in which a program for performing the above-described operations and operations described below is stored, and at least one processor for executing the stored program. When the controller 50 includes a plurality of memories and a plurality of processors, the plurality of memories and the plurality of processors may be directly connected to one chip or may be physically separated.

For example, the controller 50 may control the cradle 20 based on the image received from the camera 30, and the center speaker 10 based on the data received from the transceiver 40.

In the above, the arrangement, structure, and function of various components of the vehicle 1 have been described.

Hereinafter, a control method of the vehicle 1 using various configurations of the vehicle 1 will be described with reference to FIGS. 4 and 5.

Figure 4:
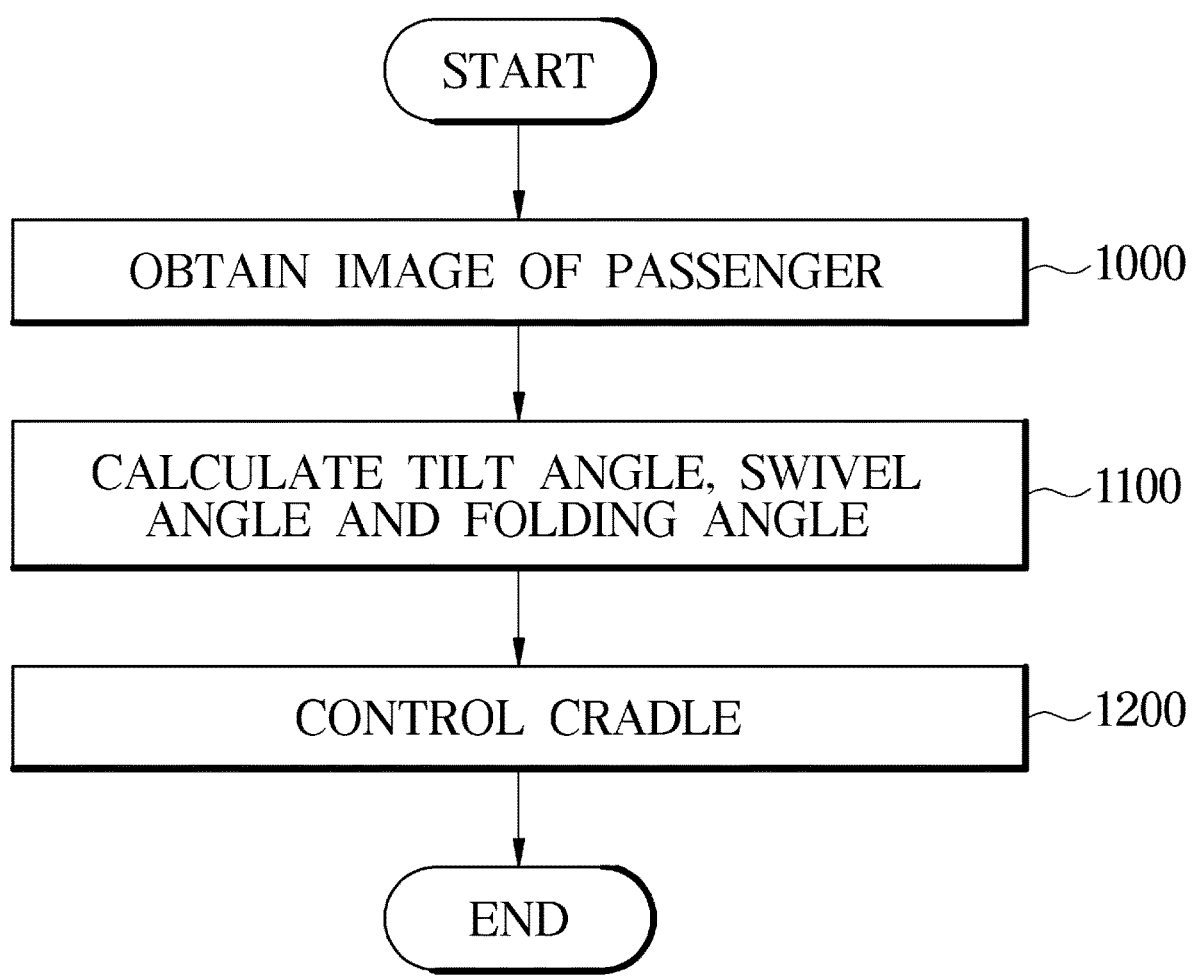
FIG. 4 is a flowchart of a control method of a vehicle in one form of the present disclosure.

FIG. 4 is a flowchart of a control method of a vehicle in some forms of the present disclosure. FIG. 5 is a flowchart of a control method of a vehicle in some forms of the present disclosure.

Referring to FIG. 4, the camera 30 may obtain an image of a passenger and transmit it to the controller 50 (1000).

The controller 50 may determine the position of the passenger's ear based on the image of the passenger, and determine the tilt angle of the cradle 20 (hereinafter 'first angle') and/or the swivel angle of the cradle 20 (hereinafter 'second angle') and/or the folding angle of the flexible device (hereinafter 'third angle') based on the position of the passenger's ear (1100).

Specifically, the controller 50 may determine the coordinates of the passenger's ear based on the center point of the center speaker 10 and may determine a first angle, a second angle, and a third angle based on the coordinates of the passenger's ear.

For convenience of explanation, it is assumed that the passenger is the driver, and the x-axis is rearward, the y-axis is left, and the z-axis is vertical.

The controller 50 may form a coordinate system using the center of the center speaker 10 as an origin, and calculate the x-coordinate, y-coordinate, and z-coordinate of the driver's ear.

The controller 50 may determine a first angle, a second angle, and a third angle for the sound signal output from the center speaker 10 to be reflected by the user terminal device 200 to reach the driver's ear coordinates.

For example, the controller 50 may calculate the incident angle at which the sound signal output from the center speaker 10 is incident on the user terminal device 200 and the reflection angle of the sound signal reflected from the user terminal device 200 based on the x-, y- and z-coordinates of the driver's ear and the x-, y- and z-coordinates of the user terminal device 200, which are assumed to be fixed to the cradle 20.

Thereafter, the controller 50 may determine a first angle, a second angle, and a third angle based on the calculated incident angle and reflection angle.

The controller 50 may control the cradle 20 to be tilted by a first angle and swiveled by a second angle. Specifically, the controller 50 may control the driving unit included in the cradle 20 so that the cradle 20 is tilted by a first angle and swiveled by a second angle.

When the user terminal device 200 is a flexible device, the controller 50 may control the angle adjustment device 22 so that the flexible device is folded by a third angle. Specifically, the controller 50 may control the driving unit included in the cradle 20 so that the flexible device is folded by a third angle.

According to the disclosed embodiment, the sound output from the center speaker 10 can be effectively delivered to the user by adjusting the tilt angle, the swivel angle of the cradle 20 and the folding angle of the flexible device placed on the cradle 20 according to the position of the passenger's ear.

Figure 5:
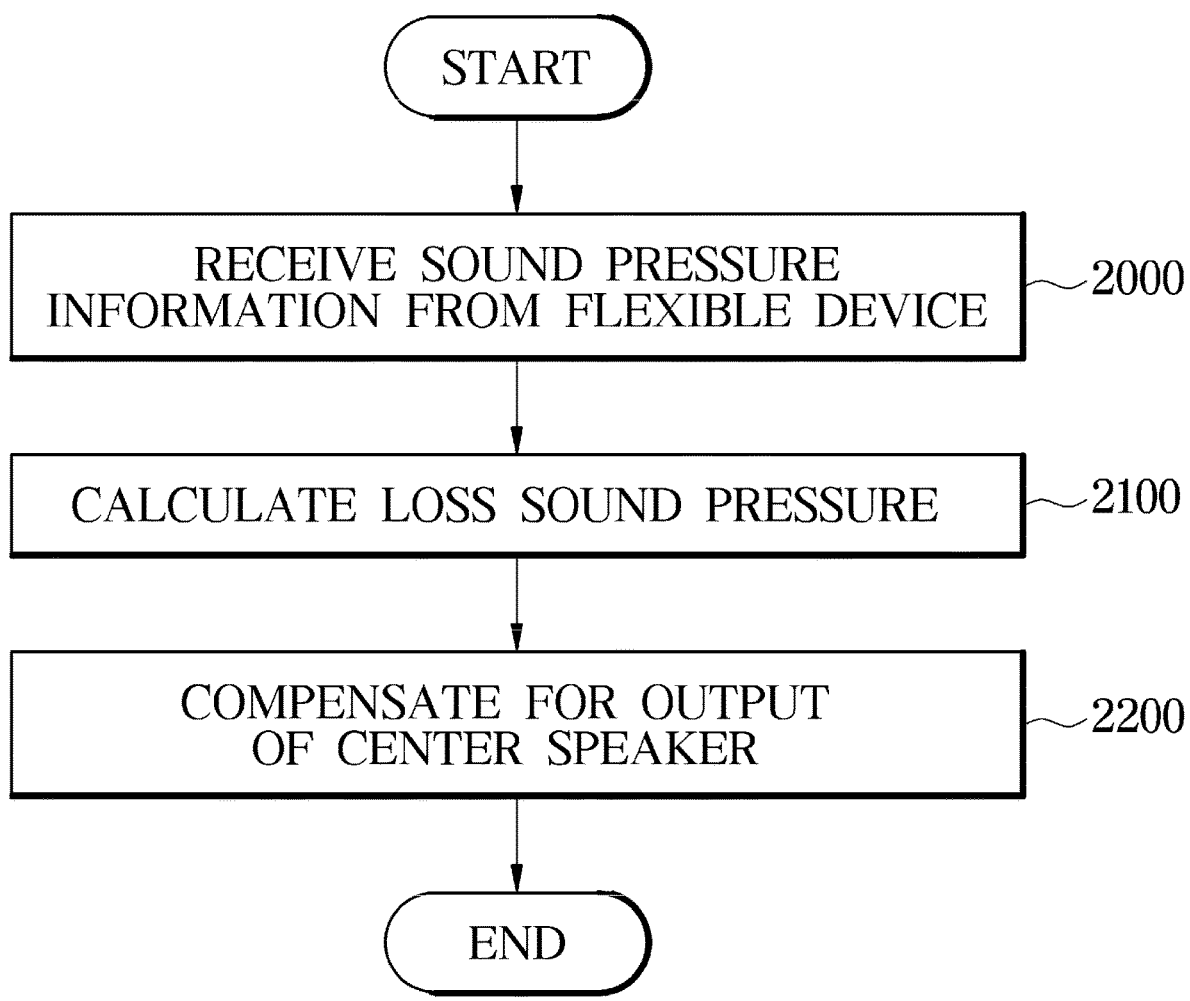
FIG. 5 is a flowchart of a control method of a vehicle in one form of the present disclosure.

Referring to FIG. 5, the transceiver 40 may receive sound pressure information from the user terminal device 200 and transmit the received sound pressure information to the controller 50.

In this case, the sound pressure information transmitted by the user terminal device 200 means sound pressure information received from the microphone 210 provided in the user terminal device 200.

As described above, the microphone 210 provided in the user terminal device 200 may be located farther from the center speaker 10, and accordingly, the sound pressure information received by the microphone 210 may mean sound pressure information of a sound diffracted without being reflected by the user terminal device 200.

The controller 50 may calculate the loss sound pressure based on the sound pressure information received from the microphone 210 of the user terminal device 200 through the transceiver 40 (2100).

For example, the controller 50 may calculate the loss sound pressure in proportion to the sound pressure size included in the sound pressure information received from the microphone 210 of the user terminal device 200.

When the user terminal device 200 includes a plurality of microphones, the controller 50 may more accurately calculate the loss sound pressure based on sound pressure information received from a plurality of microphones of the user terminal device 200.

For example, the controller 50 may calculate an average value of sound pressure size included in sound pressure information received from each of a plurality of microphones, and may calculate a loss sound pressure in proportion to the average sound pressure size.

The controller 50 may compensate for the output of the center speaker 10 based on the calculated loss sound pressure (2200).

For example, the controller 50 may increase the output of the center speaker 10 as the calculated loss sound pressure increases.

That is, the controller 50 may adjust the sound pressure of the sound output from the center speaker 10 based on the sound pressure information received from the microphone 210 of the user terminal device 200 through the transceiver 40. And for example, the controller 50 may adjust the sound pressure of the sound output by the center speaker 10 in proportion to the sound pressure size included in the sound pressure information received from the microphone 210 of the user terminal device 200.

In addition, when the user terminal device 200 includes a plurality of microphones, the controller 50 may calculate an average value of sound pressure information received from a plurality of microphones of the user terminal device 200, and may adjust the sound pressure of the sound output from the center speaker 10 in proportion to the calculated average sound pressure size.

Specifically, the controller 50 may control the amplifier included in the center speaker 10 to adjust the sound pressure of the sound output from the center speaker 10.

According to the disclosed embodiment, by compensating for the sound pressure lost by the user terminal device 200, it is possible to prevent the sound pressure of the sound that the passengers listen to from becoming inferior.

Although not shown in the drawing, the transceiver 40 can receive information that the user terminal device 200 has been placed from the cradle 20, and when the user terminal device 200 is fixed to the cradle 20, the controller 50 may control the transceiver 40 to transmit a signal for changing the user terminal device 200 to a silent mode.

The silent mode may mean a mode in which no sound is output and vibrates.

Accordingly, it is possible to solve a problem that the sound output from the center speaker 10 is deteriorated due to the sound or vibration output from the user terminal device 200.

According to the disclosed embodiment, the satisfaction of the passenger can be improved by directing the sound output from the center speaker 10 to the passenger without changing the structure of the center speaker 10.

By adjusting the tilt angle and swivel angle of the cradle according to the position of the passenger's ear, the passenger can hear the sound more effectively.

In addition, by compensating the output of the center speaker by calculating the loss sound pressure of the sound output from the center speaker, the passenger can more effectively hear the sound.

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a computer-readable recording medium.

The computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although example embodiments of the present disclosure have been shown and described, it would be appreciated by those skilled in the art that changes may be made to these embodiments without departing from the principles and spirit of the present disclosure, the scope of which is defined in the claims and their equivalents.

What is claimed is:

1. A vehicle comprising:
   a center speaker provided on a dashboard;
   a cradle provided within a preset distance from the center speaker, the cradle configured to fix a user terminal device, and to tilt and swivel, wherein the user terminal device comprises a flexible device and wherein the cradle comprises an angle adjustment device configured to adjust a folding angle of the flexible device;
   a camera configured to obtain an image of a passenger; and
   a controller configured to:
      determine an ear position of the passenger based on the image of the passenger;
      determine a first angle and a second angle based on the ear position;
      control the cradle to be tilted by the first angle and swiveled by the second angle;
      determine a third angle based on the ear position; and
      control the angle adjustment device to fold the flexible device by the third angle.

2. The vehicle according to claim 1, wherein the controller is configured to:
   determine coordinates of the ear position based on a center point of the center speaker; and
   determine the first angle, the second angle, and the third angle based on the coordinates of the ear position.

3. The vehicle according to claim 1, wherein the vehicle further comprises:
   a transceiver configured to perform a wireless or a wired communication with the user terminal device, and
   wherein the controller is configured to adjust a sound pressure of a sound output by the center speaker based on sound pressure information received from a microphone of the user terminal device through the transceiver.

4. The vehicle according to claim 3, wherein the controller is configured to:
   adjust the sound pressure corresponding to a sound pressure size included in the sound pressure information.

5. The vehicle according to claim 4, wherein the controller is configured to:
   adjust the sound pressure corresponding to an average value of the sound pressure size included in the sound pressure information received from a plurality of microphones.

6. The vehicle according to claim 1, wherein the vehicle further comprises:
   a transceiver configured to perform a wireless or a wired communication with the user terminal device, and
   wherein the controller is configured to control the transceiver to transmit a signal for changing the user terminal device to a silent mode when the user terminal device is fixed to the cradle.

7. A control method of a vehicle that comprises a center speaker provided on a dashboard and a cradle configured to fix a user terminal device and to tilt and swivel, the user terminal device comprising a flexible device and the cradle comprising an angle adjustment device configured to adjust a folding angle of the flexible device, the method comprising:
   obtaining, by a camera, an image of a passenger;
   determining an ear position of the passenger based on the image of the passenger;
   determining a first angle and a second angle based on the ear position of the passenger;
   controlling the cradle to be tilted by the first angle and swiveled by the second angle, wherein the cradle is provided within a preset distance from the center speaker;
   determining a third angle based on the ear position of the passenger; and
   controlling the angle adjustment device to fold the flexible device by the third angle.

8. The control method according to claim 7, wherein determining the first angle, the second angle and the third angle based on the ear position of the passenger comprises:
    determining coordinates of the ear position based on a center point of the center speaker; and
    determining the first angle, the second angle, and the third angle based on the coordinates of the ear position.

9. The control method according to claim 7, wherein the method further comprises:
    receiving sound pressure information from a microphone of the user terminal device; and
    adjusting a sound pressure of a sound output by the center speaker based on the sound pressure information.

10. The control method according to claim 9, wherein adjusting the sound pressure comprises:
    adjusting the sound pressure corresponding to a sound pressure size included in the sound pressure information.

11. The control method according to claim 10, wherein adjusting the sound pressure comprises:
    adjusting the sound pressure corresponding to an average value of the sound pressure size included in the sound pressure information received from a plurality of microphones.

12. The control method according to claim 7, wherein the method further comprises:
    transmitting a signal for changing the user terminal device to a silent mode when the user terminal device is fixed to the cradle.

13. The control method according to claim 7, wherein determining the ear position of the passenger, determining the first angle and the second angle, and controlling the cradle are performed by a controller of the vehicle.

14. A vehicle comprising:
    a dashboard;
    a plurality of speakers including a center speaker provided on the dashboard;
    a cradle provided within a preset distance from the center speaker, the cradle configured to fix a user terminal device and to tilt and swivel, wherein the user terminal device comprises a flexible device and wherein the cradle comprises an angle adjustment device configured to adjust a folding angle of the flexible device;
    a camera configured to obtain an image of a passenger;
    a transceiver configured to perform a wireless or a wired communication with the user terminal device; and
    a controller configured to:
        determine an ear position of the passenger based on the image of the passenger;
        determine a first angle and a second angle based on the ear position;
        control the cradle to be tilted by the first angle and swiveled by the second angle;
        determine a third angle based on the ear position; and
        control the angle adjustment device to fold the flexible device by the third angle.

15. The vehicle according to claim 14, wherein the controller is configured to:
    determine coordinates of the ear position based on a center point of the center speaker; and
    determine the first angle, the second angle, and the third angle based on the coordinates of the ear position.

16. The vehicle according to claim 14, wherein the controller is configured to adjust a sound pressure of a sound output by the center speaker based on sound pressure information received from a microphone of the user terminal device through the transceiver.

17. The vehicle according to claim 16, wherein the controller is configured to:
    adjust the sound pressure corresponding to a sound pressure size included in the sound pressure information.

18. The vehicle according to claim 17, wherein the controller is configured to adjust the sound pressure corresponding to an average value of the sound pressure size included in the sound pressure information received from a plurality of microphones.

19. The vehicle according to claim 14, wherein the controller is configured to control the transceiver to transmit a signal for changing the user terminal device to a silent mode when the user terminal device is fixed to the cradle.

* * * * *